April 19, 1960     B. M. EDSALL ET AL     2,932,940
CONTROLS FOR TORQUE CONVERTER MOVABLE BLADES
Original Filed June 22, 1955
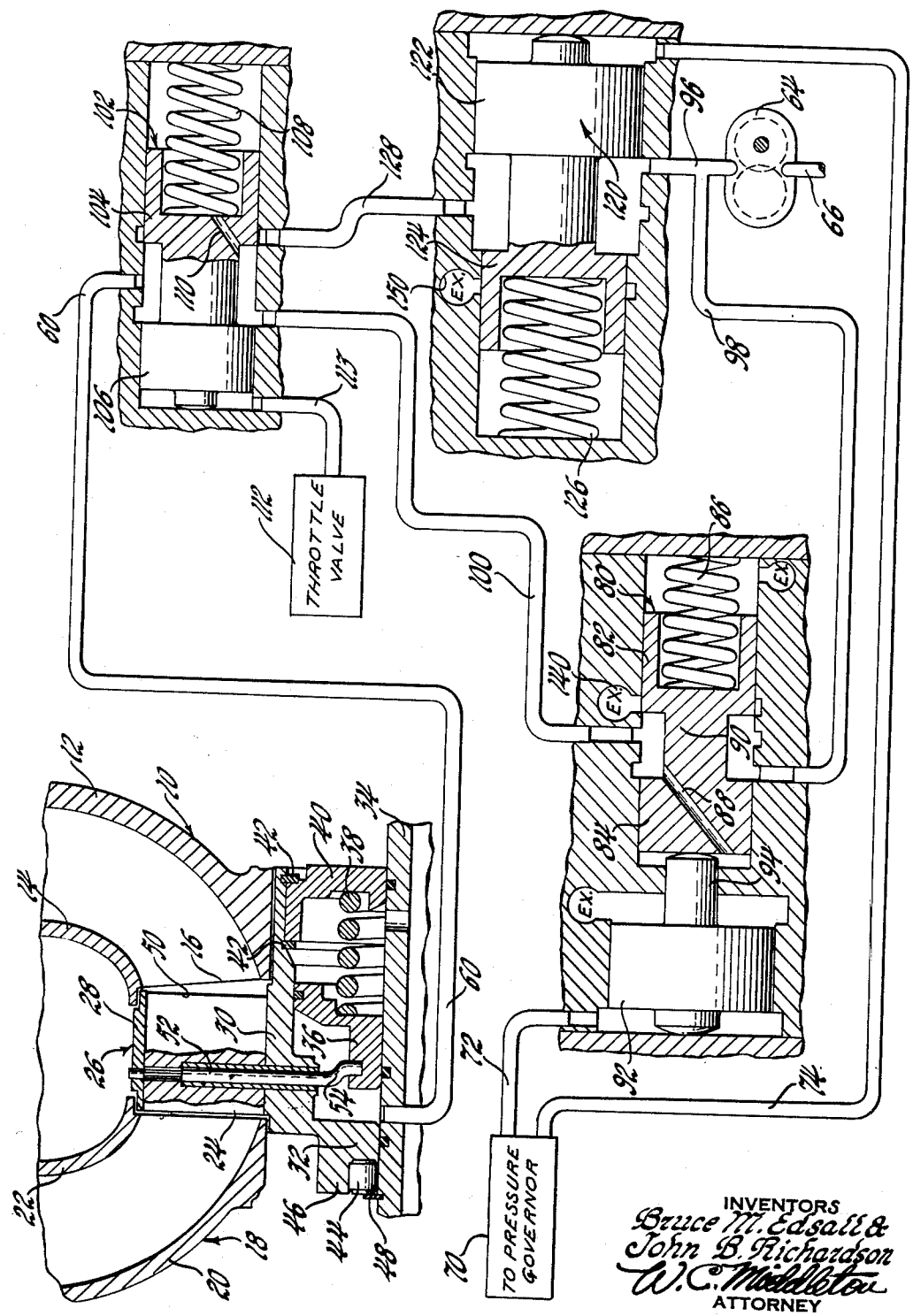
INVENTORS
Bruce M. Edsall &
John B. Richardson
W. C. Middleton
ATTORNEY

United States Patent Office 2,932,940
Patented Apr. 19, 1960

2,932,940

CONTROLS FOR TORQUE CONVERTER MOVABLE BLADES

Bruce M. Edsall, Oak Park, and John B. Richardson, Pleasant Ridge, Mich., assignors to General Motors Corporation, Detroit, Mich., a corporation of Delaware Continuation of application Serial No. 517,156, June 22, 1955. This application April 25, 1958, Serial No. 731,587

15 Claims. (Cl. 60—12)

This is a continuation of our application Serial No. 517,156 filed June 22, 1955, now abandoned.

This invention relates to controls for torque converter movable blades and more particularly to controls for the blades of a torque converter element, such as a reaction member or stator, which blades are movable from a maximum torque multiplication angle to a minimum torque multiplication angle.

In the copending application of Edsall and Moore, Serial No. 353,782, filed May 8, 1953, for Automatic Transmission, the transmission described and illustrated makes use of a torque converter having a pump, first and second turbines and a reaction member or stator. The two turbines are connected to elements of a planetary gear system in order that different stages of drive by the torque converter can be effected. The blades of the reaction member or stator of the torque converter are mounted for pivotal movement whereby the position thereof relative to the discharge of the second turbine and the entrance of the pump can be changed from a low torque multiplication angle to a high torque multiplication angle, with the possibility of the blades remaining in any intermediate angular position as the torque requirements of the transmission and the load driven thereby may require. The present invention constitutes an improved control system for determining the angle at which the blades of a reaction member or stator may be positioned at any stage of operation of the torque converter.

In the operation of vehicles employing modern high compression engines that it is sometimes of advantage to increase the speed of the engine when starting the car, particularly at wide throttle openings. For example, with some high compression engines it has been found that if the car is started with the throttle fully open, or nearly so, and if the engine speed is about 1800 r.p.m. when the car starts to move, auto-ignition may occur. If, however, the speed of the engine for wide or full throttle under the same conditions can be increased to 2400 to 2600 r.p.m., auto-ignition is not apt to occur. Inasmuch as the speed of the engine depends upon the torque ratio of the transmission, an adjustment of the torque ratio of the transmission will permit the engine speed to be increased beyond the auto-ignition range.

An object of the invention is to provide controls for a torque converter of such character that when the converter is operated for starting a vehicle in motion under wide or full throttle control of the engine, the torque converter can be automatically conditioned to accomplish high torque multiplication so that engine speed can be raised.

Another object of the invention is to provide controls for the adjustable blades of a torque converter reaction member, or stator, which controls operate automatically to provide the degree of torque multiplication in the converter that is demanded by the position of the engine controlling throttle.

Another object of the invention is to provide controls as just described which operate automatically to increase the torque multiplication by the converter during idling of the engine to such an extent that so-called creep of the vehicle driven by the torque converter is prevented.

Another object of the invention is to provide controls for the blading of the converter stator which controls automatically operate to condition the blading for maximum torque multiplication upon a full throttle acceleration of the vehicle.

A further object of the invention is to provide controls of such character as to automatically regulate the position of the stator blading to provide intermediate torque multiplication, gradually decreased to minimum torque multiplication during a light throttle acceleration of the vehicle from rest.

A still further object of the invention is to provide controls for torque converter stator blading of such character as to automatically position the blading to obtain a minimum of creep during idling of the engine and which controls function to position the blading in the maximum torque multiplication angle with substantially no delay upon full throttle acceleration of the vehicle from rest.

In carrying out the foregoing and other objects of the invention, it is to be understood that the controls illustrated and described in connection herewith are particularly adapted for, but not limited to, a transmission of the type disclosed by the aforesaid copending application. For this reason illustration has been of only part of a torque converter and shown associated therewith are certain elements which are well-known in connection with hydraulically controlled automotive transmissions. For the purposes of this invention, it is necessary only to describe the manner in which the blading of the reaction member or stator of a torque converter can be automatically controlled to provide the torque multiplication in the converter most advantageous to the operation of the converter at any of a plurality of engine throttle openings. The reaction member, or stator, of the torque converter has the blades thereof mounted for pivotal movement about axes extending radially from the hub of the stator. The blades are biased to a low torque multiplication angular position by a spring acting on a piston which receives cranks on the ends of the blades spindles. The low torque multiplication angle is that position in which a minimum of redirection of oil or other liquid is imparted to the oil passing from a turbine to the converter pump. In addition to the spring biasing means, the blades have their pivotal points so located relative to the entrance and exit ends thereof and are so spaced apart that the liquid in the working circuit of the torque converter applies a force to the blades tending to move them to the minimum angular position. As the velocity of the liquid being circulated in the converter increases, the force thereof tending to move the blades to the low angle position increases. Consequently to move the blades to a high torque multiplication angular position it is necessary to supply a force greater than the spring biasing force and that supplied by the circulation of the liquid in the converter.

The present invention provides controls whereby the blades can be moved to the high torque multiplication angular position automatically when the engine is idling, i.e., when the pump of the converter is rotating at a relatively low speed, whereby the multiplication factor of the converter is increased with an end result that the slip of the converter elements is increased so that the tendency of a vehicle driven by the converter to creep during engine idling is materially reduced if not completely eliminated. These controls operate automatically to cause the blades to be moved to the high torque multiplication angular position as soon as liquid is supplied to the converter which usually means whenever the engine of the vehicle is started. In addition, throttle valve control is exercised through the agency of a well known type of throttle valve so that the position of the blades depends upon the position of the throttle valve or the pressure regulated thereby, which regulated pressure in turn is modulated over a particular range of throttle valve operation. With such control exercised by the throttle valve, it is possible to cause the blades of the reaction member to be maintained at the maximum multiplication angle until a condition representative of high vehicle speed is reached at which time a cut off valve interrupts the supply of liquid to the piston of the converter blades permitting these blades to be moved automatically to the minimum angular position.

The manner in which the controls function to achieve the foregoing and other objects of the invention will become more apparent by reference to the following detailed description of the accompanying drawings which constitute a schematic circuit diagram of the essential parts of the controls.

Referring now to the drawings, 10 indicates generally the pump of a hydrodynamic torque converter which pump is made up of an outer shroud 12 and inner shroud 14 and blades 16 therebetween. The pump of this converter can be driven in any suitable manner by the engine of a vehicle or by any other prime mover. Inasmuch as torque converter constructions are well known, complete illustration of the pump has been omitted. In association with the pump 10 is a turbine element 18 made up of an outer shroud 20, an inner shroud 22 and blades 24 between the shrouds. This turbine 18 may be the second of two turbines in a converter of a type illustrated and described in the aforesaid copending application or may constitute the single turbine of a three-element torque converter. It will be understood that the turbine is connected to some suitable driven shaft either directly or through gearing. Illustration of such connection and such shaft does not seem to be necessary for the purposes of this invention.

Another element of torque converter comprises the reaction member or stator indicated generally at 26, which stator has an outer shroud 28 and an inner shroud 30 which is formed as part of the hub of the stator. The member 30, as will be seen from the drawings, has a portion 32 thereof rotatable about a stationary sleeve member 34. The part 32 constitutes one end of a cylinder in which is slidably mounted a piston 36. Piston 36 is biased to the left as viewed in the drawings by spring 38, one end of which bears against the piston and the other end of which bears against a closure member 40 secured to the hub part 30 by snap rings 42 in such fashion as to be rotatable with the part 30 about the stationary sleeve 34. The hub, made up of the parts 30, 32, and 40, can rotate about the stationary sleeve 34 freely in one direction but reverse rotation thereof is prevented by one-way mechanism comprising members 44 which may be rollers acting in cam slots, or sprags which operate in the well known manner to prevent rotation in one direction. These rollers, or sprags, 44 are positioned between a shoulder 46 of the part 32 and the stationary sleeve 34, being retained in place by a snap ring 48.

In addition to the inner and outer shrouds 30 and 28 beforementioned, the stator 26 has a plurality of blades 50 positioned between the shrouds and fixed to spindles 52 which are journalled in the shrouds as shown. The ends of the spindles 52 terminate in crank arms 54 which are received in a groove or other formation in piston 36 in such manner that when the piston is moved in either direction the spindles are rotated about the axes determined by the journals in the two shrouds. Such movement may require a relative rotation between the piston and the hub part 30, or if the ends of the crank arms are located in a circumferential groove in the piston, such relative rotation may not occur.

The spring 38 applies a biasing force to the piston 36 to move it to the left and thereby to urge the blades 50 into the minimum torque multiplication angular position thereof. Such position serves to impart the least redirection to oil or other liquid passing from the turbine blades 24 to the pump blades 16. Force to move the piston 36 to the right against spring 38 may be supplied by oil or liquid under pressure through the line 60 which is in communication with a through opening in the stationary sleeve 34 in such location that oil will enter the cylinder in which piston 36 slides to the left of this piston. A predetermined pressure of liquid introduced through the line 60 will move the piston 36 to the right against spring 38 and also against the force supplied by the velocity of the circulating oil in the converter to move this piston to a position determinative of maximum torque multiplication angularity of blades 50. This angularity is that which imparts to the oil discharged from turbine blades 24 a maximum change between the directions in which the oil leaves the turbine and the direction in which it enters the pump. In this manner increased torque multiplication is obtained.

Oil for application to piston 36 may be supplied by pump 64 which draws oil through line 66 from a suitable sump and delivers it to various parts of a transmission associated with the torque converter. The pump 64 which may be of gear type or any other suitable type, may be driven whenever the engine of the vehicle is running or, as is customary with transmissions of this nature, two pumps may be actually used, one an engine driven pump and the other an output shaft driven pump. The controls also include a governor 70 of well known type which constitutes a source of oil at pressures measured by the speed of rotation of some part of the transmission, for example, the output shaft thereof. This governor may be of the type shown in Thompson Patent 2,204,872 operating to regulate the pressure of oil over two ranges in one of which the pressure increases rapidly as the speed of the member driving the governor increases in rotation, and the other which serves to regulate pressure rising at a slower rate. For the purposes of this invention, it is sufficient to point out that the governor 70 regulates a first pressure rising at a fairly rapid rate and delivers the same through the line 72. It also regulates a second pressure rising at a slower rate and delivers the same through the line 74. The action resulting from these pressures will be explained later.

The controls include a low speed regulating valve indicated generally at 80, which valve has lands 82 and 84 of the same diameter. A spring 86 biases the valve 80 open or to the left. A channel 88 extends from the part 90 of reduced diameter between lands 82 and 84 to the left end of land 84. In association with valve 80 is a governor plug 92 fitting in a bore of larger diameter than that receiving the valve 80 and having a stem 94 extending through an end wall of the bore in which valve 80 is slidable. Oil from pump 64 can pass through line 96 and branch 98 thereof to a port in the body of the regulating valve to enter the bore thereof between lands 82 and 84 when this valve 80 is open, and can continue through line 100 to a throttle modulating valve indicated generally at 102. The throttle modulated valve 102 has spaced lands 104 and 106 of the same diameter and this valve is slidable in a bore of the valve body, being urged to the left by spring 108. A diagonal passage 110 affords communication between that part of the bore between lands 104 and 106 and the bore to the right of the land 104. In association with the throttle modulator valve 102 use is made of a throttle valve indicated generally at 112 which is of the type commonly used in automatic hydraulically controlled transmissions. A valve of this type has been illustrated and described in the aforesaid copending application and it is believed sufficient at this time merely to point out that the throttle valve operates to regulate an oil pressure which increases as the engine throttle is opened, delivering a pressure which may vary from zero to full pump pressure. When the throttle modulator valve 102 is in the position shown in the drawing, it will be evident that oil reaching the bore thereof through the line 100 can pass therefrom into the line 60 which extends to the piston 36 of the converter stator.

The final valve employed in these controls comprises the high speed cut off valve 120 which has lands 122 and 124 of different diameters. The valve 120 is slidable in the stepped bore provided therefor in the valve body. Valve 120 is biased open or to the right by spring 126 and when in this position it completes communication through the bore for oil from pump delivery line 96 to a line 128 which extends to a port in the bore of the throttle modulator valve 102 at which location further progress is arrested so long as valve 102 is in the position shown.

For a complete understanding of the operation of these controls, it is necessary to assign a selected series of values to the various biasing means, but it will be understood that these values are not critical but can be varied for whatever calibration of the system may be considered advantageous. With this in mind, therefore, let it be assumed that the spring 38 is preloaded to exert a force of 10 p.s.i. on piston 36. The spring 86 is preloaded to exert a force of 28 p.s.i. on the low speed regulator valve 80. Spring 108 is preloaded to exert a force of 35 p.s.i. on the throttle modulator valve 102. Spring 126 is so preloaded as to exert a force which will hold the valve 120 in its illustrated position until the governor 70 delivers a pressure thereto through the line 74 which is representative of a predetermined vehicle speed, which for purposes of illustration may be described as 58 m.p.h. With these spring values in mind and with the assumption that the pump 64 delivers a pressure varying from 65 to 130 p.s.i. and that the throttle valve 112 regulates pressure supplied through the line 113 to the throttle modulator valve 102 over a range extending from zero at closed throttle position to pump pressure, or 130 p.s.i., at wide open throttle position.

Idling

With the pump 10 of the converter being driven at idling speed, i.e., in the neighborhood of 400 to 500 r.p.m.; with the governor not in operation due to the vehicle being stationary; and with the throttle valve supplying no oil pressure through line 113 to the throttle modulator valve, the following operation occurs. Oil from the pump 64 is supplied through the line 96 to the bore of the cut-off valve 120 and thence through line 128 to a port in the body of the throttle modulator valve 102 at which location further flow is blocked. Simultaneously oil passes through the branch line 98 from line 96 to the bore of the low speed regulator valve 80 between lands 82 and 84 thereof and from this bore through the line 100 to the bore of the throttle modulator valve 102 between lands 104 and 106 thereof. The oil entering this bore can continue through the line 60 to the left end of piston 36 to the converter stator, exerting a force thereon to move this piston 36 to the right against spring 38 to increase the angle of the blades. Full pump pressure, however, is not fed in the path just described to piston 36 due to the action of the low speed regulator valve 80. A part of the oil entering the bore of this valve between lands 82 and 84 continues through the diagonal channel 88 to the left end of channel 84, there to exert pressure to move the valve 80 to the right against the resistance of spring 86. As soon as the pressure developed beyond the low speed pressure regulator valve exceeds the preloaded strength of spring 86, i.e., 28 p.s.i., this pressure is reflected on the left end of land 84 and will move the valve 80 to the right against spring 86. Such movement causes a partial closing of the port connected to line 98 and at the same time causes a partial opening of the port connected to exhaust passage 140, which passage permits oil to be exhausted to reduce the pressure thereof. When the pressure in line 100 and other parts of the system in communication therewith falls below the preloading of spring 86, this spring serves to return the valve 80 to the illustrated position completing a cycle of regulation. So long as the governor 70 is inactive the regulator valve 80 operates to regulate the delivered pressure therefrom to a maximum value of slightly in excess of the strength of spring 86, that is, slightly in excess of 28 p.s.i. This regulated pressure of the order just mentioned is fed to the piston 36 and, with the pump 10 at idling speed, the hydraulic pressure applied to piston 36 is sufficient to move this piston to the right thereby changing the angle of the blades 50 from low to high. As is known, increase in the angle of the blades reduces or eliminates the tendency of the vehicle to creep when the engine is idling. So long as the pump 10 is rotating at idling speed, the velocity of the liquid circulating in the converter is not high enough to exert a force sufficiently great to move the blades 50 to low angle. Using the figures before mentioned, it will be seen that during idling a hydraulic pressure of the order 28 p.s.i. or slightly more is supplied to the piston 36 to oppose the pressure of spring 38 (10 p.s.i.) and the effect of the velocity of the circulating liquid in the converter. The blades therefore will be held in a relatively high angular position so long as idling speed of the pump 10 is not exceeded.

At the same time that liquid is supplied to the piston 36 by way of the bore of the throttle modulator valve 102, some of this liquid passes through the diagonal channel 110 to the right of valve 102 there to aid spring 108 in holding the valve 102 in the position shown. This hydraulic pressure combines with the spring pressure to create a total of the order 63 p.s.i. acting on the valve 102 but this force performs no useful function during idling or even during some throttle valve conditions which will be described later.

Light throttle acceleration

If it is desired to accelerate the pump 10 of the converter to such a degree as to cause a drive by the turbine 18 of the converter, such acceleration of the converter pump can be carried out with various throttle openings. If a light throttle opening is employed, the following action will take place so long as the pressure delivered by the throttle valve 112 through line 113 to the left end of land 106 does not exceed 35 p.s.i. Assuming that the pump 10 is accelerated under light throttle and a vehicle driven by the converter is placed in motion, the following occurs. Slow speed regulator valve 80 which had been regulating pressure to the order of 28 p.s.i. during idling of pump 10 continues its function of regulating the pressure supplied to piston 36 but this regulation is influenced by pressure supplied by the governor 70 through line 72 to the left end of the governor plug 92. Since this governor pressure increases in accordance with the speed of the vehicle, the pressure delivered thereby will act to reduce the pressure delivered through the line 100. In other words, if the governor pressure has an effective force of 10 p.s.i. at a particular instant, the pressure regulated by the valve 80 will then fall to 18 instead of 28 p.s.i. This pressure may not be sufficient to hold the piston 36 in its high blade angularity position since the pressure of 18 p.s.i. is opposed not only by the spring 38 but is also opposed by the velocity of the circulating liquid in the converter. Consequently, the present arrangement makes possible a start of operation in which the blades 50 are almost immediately subjected to forces moving them from their high angularity position to an intermediate position. The illustrative governor pressure just given is merely as an example and is not indicative of any particular phase of operation. However, in practice it has been found that with a light throttle opening and with the converter pump 10 being accelerated, the almost immediate result is the positioning of the vanes 50 in an intermediate angular position so that the vehicle can be smoothly accelerated and then as the velocity of the fluid in the converter further increases and as the regulated pressure delivered by valve 80 decreases, these blades will be restored in gradual manner to low angularity position without any jerk or sudden movement thereof of a nature that can be felt in the vehicle.

The regulation action of valve 80 continues until the governor pressure delivered through line 72 exceeds 28 p.s.i. at which time the plug 92 will force valve 80 to the right causing land 84 to close the port connected to supply line 98 and to open fully the port connected to the exhaust passage 140 so that oil in line 100, line 60 and in the cylinder of piston 36 will be exhausted assuring positioning of blades 50 in their minimum torque multiplication angular position. During such light throttle position the throttle modulating valve 102 remains stationary since throttle valve pressure delivered through line 113 is never high enough to move valve 102 to the right against spring 108.

*Medium throttle acceleration*

Assume again that the converter is to be accelerated from idling condition but with a medium throttle such as would cause the throttle valve 112 to supply a throttle valve pressure 55 p.s.i. to the left end of land 106. As the acceleration is initiated this throttle valve pressure of 55 p.s.i. is not sufficient to move the throttle modulator valve 102 to the right against spring 108 and the hydraulic pressure aiding this spring since these two pressures combined are of the order of 63 p.s.i. Under these circumstances acceleration will be initially in the same fashion as before described with a gradual reduction in the pressure supplied by the valve 80 to the line 100 and thence to the line 60. However, when the pressure in line 100 and in line 60 drops below 20 p.s.i. the combined pressure acting on the right end of valve 102 will be less than 55 p.s.i. which is the throttle valve pressure of this example. When this occurs the throttle valve pressure will move valve 102 to the right closing the port connected to line 100 and opening the port connected to line 128. Full pump pressure in line 128 at this time will then enter the bore of the valve 102 and some of the oil will continue through line 60 to the piston 36 and some will pass through the diagonal channel 110 into the chamber of spring 108. As soon as the pressure thus developed in the system beyond the valve 102 and particularly to act on piston 36 exceeds 20 p.s.i., the effect thereof in the chamber of spring 108 and acting on the right end of land 104 of valve 102 combined with spring 108 will be to move this valve to the left against throttle valve pressure of 55 p.s.i. Movement to the original position causes the oil of the pressure of slightly over 20 p.s.i. to be effective in line 100 to in turn cause the action of valve 80 to exhaust the same if such valve has not been moved to the full exhaust position. For example, if the valve 80 is operating to deliver pressure to line 100 in the order of 10 p.s.i. when valve 102 has been moved to the right, the sudden influx of oil into this line 100 at 20 p.s.i. will merely be reflected back to valve 80, there to be exhausted. If the valve 80 has been moved by governor pressure to a position fully closing the port connected to line 98 and fully opening the port connected to exhaust passage 140, the line 100 will serve merely as an exhaust line.

The just described action of valve 102 therefore is to cause the delivery by this valve into line 60 and then to piston 36 of a pressure which corresponds to the imposed throttle valve pressure minus the preloading of spring 108. With the example just given, i.e., a throttle valve pressure of 55 p.s.i., it will be seen that the maximum pressure that can be delivered to the piston 36 will be in the order of 20 p.s.i. So long as the throttle valve is held in position to deliver this pressure to the throttle modulator valve, the modulated pressure is applied to piston 36 holding the same in an intermediate torque multiplication position over a longer period of time than during light throttle operation since the velocity of the fluid circulating in the converter must increase sufficiently to overcome the hydraulic pressure on piston 36 in excess of that necessary to balance the force of spring 38. In medium throttle position, therefore, the pump 10 can accelerate to a considerably higher speed of revolution before the blades 50 are restored in a gradual manner to the low torque multiplication angularity than with a light throttle acceleration.

*Wide throttle acceleration*

At any throttle position wherein the throttle valve 112 delivers a pressure to the throttle modulator valve in excess of 63 p.s.i., the following takes place. If the vehicle is being accelerated from rest with such a throttle valve position, the immediate effect thereof is to force the throttle modulator valve 102 to the right closing the port connected to the line 100 and opening the port connected to line 128. Pressure delivered by valve 102 through line 60 to piston 36 will then be a pressure equal to throttle valve pressure minus the 35 p.s.i. preloading of spring 108. For example with 90 lbs. throttle valve pressure, the valve 102 will regulate in the manner before described to cause a delivered pressure in line 60 of 55 p.s.i. Such higher pressure acting on piston 36 will hold it in the high torque multiplication angular position over an extended period of operation. The necessary exhaust for valve 102 during its regulating action again is obtained by impressing the regulated pressure, or excess pressure, into line 100 and back to the regulator valve 80 which can relieve the excess pressure. With a pressure of 55 p.s.i. imposed on the piston 36, it follows that the blades 50 can be moved to the low torque multiplication position only when the velocity of the liquid being circulated in the converter has attained a high degree. It is even possible that with such a pressure, the blades will be held against return to low angular position until the vehicle has reached a speed at which the cut off valve 120 functions. If this valve is calibrated to operate at a vehicle speed of say 58 m.p.h. when governor pressure in line 74 is representative of that speed, the valve 120 will be moved to the left against spring 126 closing the port connected to supply line 96 and connecting the port of line 128 to the exhaust passage 150. This latter condition immediately exhausts all liquid being supplied to piston 36 so that the blades are promptly moved to low angular position by the combined action of spring 38 and the circulating fluid in the converter. If the throttle is held more or less constant and the vehicle speed decreased below say 54 m.p.h., spring 126 can then act to move the cut off valve 120 to the right, restoring it to the illustrated position whereupon the throttle modulator valve 102 will again function in the manner before described. It will be noted that land 122 of valve 120 is larger than land 124 so that these unbalanced areas of the two lands cause a different upshift and downshift point. With oil in the bore between lands 122 and 124, greater pressure is exerted to hold the valve to the right than when oil is exhausted from this bore. The spring 126 therefore can be calibrated for whatever speed of operation is desired and likewise the hysteresis effect of the two lands can be calculated for a desired speed differential.

*Full throttle acceleration*

If maximum acceleration of the vehicle with maximum torque multiplication in the converter is desired, the throttle can be moved so that throttle valve 112 delivers maximum throttle valve pressure to the valve 102. With the examples before given, it will be apparent that throttle valve pressure, being pump pressure, will be on the order of 130 p.s.i. so that the valve 102 will regulate or modulate a pressure to be delivered to piston 36 in the order of 95 p.s.i., the differential between the throttle valve pressure and the spring 108. Assuming that the vehicle is being accelerated from idling or at rest, it follows that the immediate supply of 95 lbs. pressure to the piston 36 will compel the blades 50 to be held in the high torque multiplication angular position as the pump 10 is accelerated and that there will be no delay in the assumption of this angular position. Consequently acceleration can be immediate and of the maximum value. At full throttle operation the modulated pressure to piston 36 will continue and will be high enough to hold the blades in high angular position until the vehicle reaches a speed at which time the cut off valve 120 will operate.

A highly important advantage resides in utilizing the controls just described, particularly for wide or full throttle operation, since positioning of the blades in the high angularity position and maintaining the blades in such position so increases the torque absorption capability of the converter as to raise the stall speed of an engine driving the same to a speed above that speed at which auto-ignition has been found to occur.

The torque multiplication ratio of the converter can be increased at any time during the operation of the converter below the speed at which cut off valve 120 operates by merely adjusting the throttle so that the throttle valve 112 will deliver a pressure which can cause the before described operation of the throttle modulator valve 102. If the vehicle is cruising at a speed below the cut off speed with the throttle at other than full throttle position and with the blades 50 in the low torque multiplication angular position or some intermediate position, a movement of the throttle to cause throttle valve 112 to deliver maximum pressure will immediately result in changing the angularity of the blades to the high torque multiplication position. In this fashion the driver of the vehicle is able to determine the operating condition of the converter over a wide range of vehicle speed. Similarly a relaxation of the throttle pressure delivered by valve 112 will hasten the automatic movement of the blades 50 to low angle position from high angle position or any intermediate position.

It is to be understood that the invention is capable of modification, that the particular values of preloading of the springs are merely illustrative and that other changes in calibration can be made all within the scope of the following claims.

What is claimed is:

1. In a transmission for a vehicle, a torque converter having bladed pump and turbine elements and a reaction element, said reaction element having blades movable from a high torque multiplication angular position to a low torque multiplication angular position, a movable member connected to said blades to control the position thereof, means exerting a constant biasing force on said movable member to move said blades to the low torque multiplication angular position, said blades being so mounted in said reaction member that the force upon said blades of the liquid circulating in said converter assists said biasing means, a source of fluid under pressure, and a pressure regulator valve for regulating and delivering pressure from said source to said movable member to oppose said biasing means thereby to move said blades toward the high torque multiplication angular position during relatively slow speed operation of said converter.

2. In a transmission for a vehicle, a torque converter having bladed pump and turbine elements and a reaction element, said reaction element having blades movable from a high torque multiplication angular position to a low torque multiplication angular position, a movable member connected to said blades to control the position thereof, means exerting a constant biasing force on said movable member to move said blades to the low torque multiplication angular position, said blades being so mounted in said reaction member that the force upon said blades of the liquid circulating in said converter assists said biasing means, said force increasing with increase in speed of rotation of said pump element, a source of fluid under pressure, and a pressure regulator valve for regulating and delivering pressure from said source to said movable member to oppose said biasing means thereby to move said blades toward the high torque multiplication angular position during relatively slow speed operation of said converter.

3. In a transmission for a vehicle, a torque converter having bladed pump and turbine elements and a reaction element, said reaction element having blades movable from a high torque multiplication angular position to a low torque multiplication angular position, a movable member connected to said blades to control the position thereof, means exerting a constant biasing force on said movable member to move said blades to the low torque multiplication angular position, said blades being so mounted in said reaction member that the force upon said blades of the liquid circulating in said converter assists said biasing means, a source of fluid under pressure, a governor for regulating variable pressure, and a pressure regulator valve for regulating and delivering pressure from said source to said movable member to oppose said biasing means thereby to move said blades toward the high torque multiplication angular position, said pressure regulator valve being acted upon by variable pressure from said governor for reducing the pressure delivered to said reaction element from said regulator valve as the pressure from said governor increases.

4. In a transmission for a vehicle, a torque converter having bladed pump and turbine elements and a reaction element, said reaction element having blades movable from a high torque multiplication angular position to a low torque multiplication angular position, a movable member connected to said blades to control the position thereof, means exerting a constant biasing force on said movable member to move said blades to the low torque multiplication angular position, said blades being so mounted in said reaction member that the force upon said blades of the liquid circulating in said converter assists said biasing means, said force increasing with increase in speed of rotation of said pump element, a source of fluid under pressure, a governor for regulating variable pressure, and a pressure regulator valve for regulating and delivering pressure from said source to said movable member to oppose said biasing means thereby to move said blades toward the high torque multiplication angular position, said pressure regulator valve being acted upon by variable pressure from said governor for reducing the pressure delivered to said movable member from said regulator valve as the pressure from said governor increases.

5. In a transmission for a vehicle, a torque converter having bladed pump and turbine elements and a reaction element, said reaction element having blades movable from a high torque multiplication angular position to a low torque multiplication angular position, a movable member connected to said blades to control the position thereof, means exerting a constant biasing force on said movable member to move said blades to the low torque multiplication angular position, said blades being so mounted in said reaction member that the force upon said blades of the liquid circulating in said converter assists said biasing means, a source of fluid under pressure, a governor for regulating variable pressure and a pressure regulator valve for regulating and delivering pressure from said source to said movable member to oppose said biasing means thereby to move said blades toward the high torque multiplication angular position, said pressure regulator valve being acted upon by variable pressure from said governor for reducing the pressure delivered to said movable member from said regulator valve as the pressure from said governor increases, said regulator valve exhausting pressure from said movable member when said pressure from said governor acting thereon exceeds a predetermined maximum.

6. In a transmission for a vehicle, a torque converter having bladed pump and turbine elements and a reaction element, said reaction element having blades movable from a high torque multiplication angular position to a low torque multiplication angular position, a movable member connected to said blades to control the position thereof, means exerting a constant biasing force on said movable member to move said blades to the low torque multiplication angular position, said blades being so mounted in said reaction member that the force upon said blades of the liquid circulating in said converter assists said biasing means, said force increasing with increase in speed of rotation of said pump element, a source of fluid under pressure, a governor for regulating variable pressure, and a pressure regulator valve for regulating and delivering pressure from said souce to said movable member to oppose said biasing means thereby to move said blades toward the high torque multiplication angular position, said pressure regulator valve being acted upon by variable pressure from said governor for reducing the pressure delivered to said movable member from said regulator valve as the pressure from said governor increases, said regulator valve exhausting pressure from said movable member when said pressure from said governor acting thereon exceeds a predetermined maximum.

7. In a transmission for a vehicle, a torque converter having bladed pump and turbine elements and a reaction element, said reaction element having blades movable from a high torque multiplication angular position to a low torque multiplication angular position, a movable member connected to said blades to control the position thereof, means exerting a constant biasing force on said movable member to move said blades to the low torque multiplication angular position, said blades being so mounted in said reaction member that the force upon said blades of the liquid circulating in said converter assists said biasing means, a source of fluid under pressure, a manually operated valve for regulating variable pressure, a governor for regulating variable pressure, a pressure regulating valve for regulating and delivering pressure from said source to said movable member to oppose said biasing means thereby to move said blades toward the high torque multiplication angular position, said pressure regulating valve being acted upon by variable pressure from said governor for reducing the pressure delivered to said movable member, a modulator valve interposed between said regulating valve and said movable member, a connection between said modulator valve and said source, said modulator valve being subject to pressure from said manually operated valve for modulating the pressure of fluid to said movable member in accordance with the pressure from said manually operated valve, and a valve intermediate said source of pressure and said modulator valve for interrupting the flow of fluid from said source to said modulator valve upon the attainment of a predetermined delivered pressure by said governor.

8. In a transmission for a vehicle, a torque converter having bladed pump and turbine elements and a reaction element, said reaction element having blades movable from a high torque multiplication angular position to a low torque multiplication angular position, a movable member connected to said blades to control the position thereof, means constantly exerting a biasing force on said movable member to move said blades to the low torque multiplication angular position, said blades being so mounted in said reaction member that the force upon said blades of the liquid circulating in said converter assists said biasing means, a source of fluid under pressure, a manually operated valve for regulating variable pressure, a governor for regulating variable pressure, a pressure regulating valve for regulating and delivering pressure from said source to said movable member to oppose said biasing means thereby to move said blades toward the high torque multiplication angular position, said pressure regulating valve being acted upon by variable pressure from said governor for reducing the pressure delivered to said movable member, a modulator valve interposed between said regulating valve and said movable member, a connection between said modulator valve and said source, said modulator valve being subject to pressure from said manually operated valve for modulating the pressure of fluid to said movable member in accordance with the pressure from said manually operated valve over a range of relatively high pressure from said manually operated valve, and a valve intermediate said source of pressure and said modulator valve for interrupting the flow of fluid from said source to said modulator valve upon the attainment of a predetermined delivered pressure by said governor.

9. In a transmission for a vehicle, a torque converter having bladed pump and turbine elements and a reaction element, said reaction element having blades movable from a high torque multiplication angular position to a low torque multiplication angular position, a movable member connected to said blades to control the position thereof, means constantly exerting a biasing force on said movable member to move said blades to the low torque multiplication angular position, said blades being so mounted in said reaction member that the force upon said blades of the liquid circulating in said converter assists said biasing means, a source of fluid under pressure, a manually operated valve for regulating variable pressure, a governor for regulating variable pressure, a pressure regulating valve for regulating and delivering pressure from said source to said movable member to oppose said biasing means thereby to move said blades toward the high torque multiplication angular position, said pressure regulating valve being acted upon by variable pressure from said governor for reducing the pressure delivered to said movable member, a modulator valve interposed between said regulating valve and said movable member, a connection between said modulator valve and said source, said modulator valve being subject to pressure from said manually operable valve for modulating the pressure of fluid to said movable member in accordance with the pressure from said manually operated valve over a range of relatively high pressure from said manually operated valve, and a valve intermediate said source of pressure and said modulator valve upon the attainment of a predetermined delivered pressure by said governor, said modulator valve being so calibrated as to be inoperative to modulate pressure from said source over a range of relatively low pressure from said manually operated valve.

10. In a transmission for a vehicle, a torque converter having bladed pump, turbine and reaction elements, one of said elements having the blades thereof movable from a high torque multiplication angular position to a low torque multiplication angular position, a movable member connected to said blades to control the position thereof, means exerting a biasing force on said movable member to move said blades to the low torque multiplication angular position, a source of fluid under pressure, a governor for regulating variable pressure, and a pressure regulating valve for regulating and delivering pressure from said source to said movable member to oppose said biasing means thereby to move said blades toward the high torque multiplication angular position, said pressure regulating valve being acted upon by variable pressure from said governor for reducing the pressure delivered to said movable member as governor pressure increases thereby to cause said movable blades to be moved to the low torque multiplication angular position.

11. In a transmission for a vehicle, a torque converter having bladed pump, turbine and reaction elements, one of said elements having the blades thereof movable from a high torque multiplication angular position to a low torque multiplication angular position, a movable member connected to said blades to control the position thereof, means constantly exerting a biasing force on said movable member to move said blades to the low torque multiplication angular position, a source of fluid under pressure, a manually operated valve for regulating variable pressure, a governor for regulating variable pressure, a pressure regulating valve for regulating and delivering pressure from said source to said movable member to oppose said biasing means thereby to move said blades toward the high torque multiplication angular position, said pressure regulating valve being acted upon by variable pressure from said governor for reducing the pressure delivered to said movable member, a modulator valve interposed between said regulating valve and said movable member, a connection between said modulator valve and said source, said modulator valve being subject to pressure from said manually operated valve for modulating the pressure of fluid to said movable member in accordance with the pressure from said manually operated valve, and a valve intermediate said source of pressure and said modulator valve for interrupting the flow of fluid from said source to said modulator valve upon the attainment of a predetermined delivered pressure by said governor.

12. A power transmission comprising in combination a hydrodynamic torque converter which circulates liquid through rotatable impeller, turbine and reaction elements, one of said elements having blades each of which is movable from a position making a high angle to a position making a low angle with a plane determined by the blade and the axis of rotation of the elements, an output member driven by the converter, a control member which determines the angular positions of the blades, means constantly urging the control member to hold the blades in low angle, said movable blades being so mounted in their rotatable element that the force of circulating liquid also urges the blades toward low angle, a source of fluid under pressure which is operative whenever the impeller is rotating to maintain pressure sufficient to move the control member to high angle, and means responsive to rotation of the impeller below a predetermined speed for establishing communication between the source and the control member to urge the blades toward high angle, said last-named means being responsive to rotation of the output members above a predetermined speed for disconnecting the source of pressure from the control member.

13. A power transmission comprising in combination a hydrodynamic torque converter which circulates liquid through rotatable impeller, turbine and reaction elements, one of said elements having blades each of which is movable from a position making a high angle to a position making a low angle with a plane determined by the blade and the axis of rotation of the elements, an output member driven by the elements, a control member which determines the angular positions of the blades, means constantly urging the control member to hold the blades in low angle, a source of fluid under pressure which is operative whenever the impeller is rotating to maintain pressure sufficient to move the control member to high angle, and means responsive to rotation of the impeller below a predetermined speed for establishing communication between the source and control member to urge the blades toward high angle, said last-named means being responsive to rotation of the output member above a predetermined speed for disconnecting the source of pressure from the control member.

14. A power transmission comprising in combination an input shaft connected to an output shaft through a hydrodynamic torque converter which circulates liquid through rotatable impeller, turbine and reaction elements, one of said elements having blades each of which is movable from a position making a high angle to a position making a low angle with a plane determined by the blade and its axis of revolution, a control member which determines the angular positions of the blades, means constantly urging the control member to hold the blades in low angle, said movable blades being so mounted in their rotatable element that the force of circulating liquid also urges the blades toward low angle, a first source of fluid under pressure, a regulator valve normally delivering a substantially constant pressure from said first source, means for conducting pressure fluid from the regulator valve to the control member during slow rotation of the impeller to urge the blades toward high angle; a governor which is a second source of pressure which varies with the speed of the output shaft, means associated with the pressure regulator valve for reducing the pressure delivered by the regulator valve, and means for conducting pressure fluid to the pressure reducing means from the governor to reduce the pressure on the control member as the speed of the output shaft increases.

15. A power transmission comprising in combination an input shaft driven by an engine controlled by a throttle, the input shaft being connected to an output shaft through a hydrodynamic torque converter which circulates liquid through rotatable bladed impeller, turbine, and reaction elements, one of said elements having blades each of which is movable from a position making a high angle to a position making a low angle with a plane determined by the blade and the axis of rotation of the elements, a control member which determines the angular positions of the blades, means constantly urging the control member to hold the blades in low angle, a source of fluid under pressure, a regulator valve which normally maintains substantially constant the pressure of the source, means for conducting pressure fluid from the source to the control member to urge the blades to high angle, means responsive to the speed of the output shaft for reducing the pressure on the control member, and means responsive to increasing opening of the throttle for increasing the pressure on the control member.

References Cited in the file of this patent

UNITED STATES PATENTS

| | | |
|---|---|---|
| 2,122,169 | Wilson | June 28, 1938 |
| 2,727,360 | Kelley | Dec. 20, 1955 |

FOREIGN PATENTS

| | | |
|---|---|---|
| 444,171 | Great Britain | Mar. 16, 1936 |

UNITED STATES PATENT OFFICE

CERTIFICATE OF CORRECTION

Patent No. 2,932,940                                  April 19, 1960

Bruce M. Edsall et al.

It is hereby certified that error appears in the printed specification of the above numbered patent requiring correction and that the said Letters Patent should read as corrected below.

Column 12, line 50, after "valve" insert -- for interrupting the flow of fluid from said source to said modulator valve --.

Signed and sealed this 22nd day of November 1960.

(SEAL)
Attest:

KARL H. AXLINE                                     ROBERT C. WATSON
Attesting Officer                                    Commissioner of Patents